(12) United States Patent
Ito et al.

(10) Patent No.: US 7,576,805 B2
(45) Date of Patent: Aug. 18, 2009

(54) DISPLAY DEVICE WITH LIGHT GUIDE PLATE HAVING ANTIREFLECTION PORTIONS ON LIGHT INCIDENT SURFACES

(75) Inventors: Atsushi Ito, Tokyo (JP); Akimasa Yuuki, Tokyo (JP); Nobuyuki Zumoto, Tokyo (JP); Toshiyuki Yoneda, Tokyo (JP); Tomohiro Sasagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 369 days.

(21) Appl. No.: 11/243,452

(22) Filed: Oct. 5, 2005

(65) Prior Publication Data

US 2006/0132673 A1    Jun. 22, 2006

(30) Foreign Application Priority Data

Dec. 22, 2004    (JP) .............................. 2004-371431

(51) Int. Cl.
*G02F 1/1335*    (2006.01)
*F21V 7/04*    (2006.01)

(52) U.S. Cl. ........................... 349/15; 349/62; 349/137; 362/621; 362/622

(58) Field of Classification Search ................... 349/15, 349/61–71, 95, 137; 326/31, 600–634; 385/146, 385/901; 362/623, 621, 622
See application file for complete search history.

(56) References Cited

U.S. PATENT DOCUMENTS

| | | | |
|---|---|---|---|
| 6,975,370 B2* | 12/2005 | Yu et al. | 349/65 |
| 7,046,318 B2* | 5/2006 | Yu et al. | 349/64 |
| 2003/0174262 A1* | 9/2003 | Sugawara et al. | 349/65 |
| 2004/0145914 A1* | 7/2004 | Yu et al. | 362/558 |
| 2005/0002176 A1* | 1/2005 | Cha et al. | 362/31 |
| 2005/0073625 A1* | 4/2005 | Daiku et al. | 349/64 |

FOREIGN PATENT DOCUMENTS

JP    2001066547 A  *  3/2001

\* cited by examiner

*Primary Examiner*—David Nelms
*Assistant Examiner*—Jessica M Merlin
(74) *Attorney, Agent, or Firm*—Leydig, Voit & Mayer, Ltd.

(57) ABSTRACT

A display device includes a light guide plate which includes a light transmission portion and an antireflection portion at two opposite end faces and which is provided with a light extraction portion in part of a surface, respective light sources which are arranged on outer sides of the two opposite end faces, a transmission liquid crystal panel located adjacent to the light extraction portion, and a synchronous drive unit that alternately turns ON the light sources and that displays an image that is synchronous with an alternating turn-ON operation of the transmission liquid crystal panel.

20 Claims, 10 Drawing Sheets

DISPLAY DEVICE WITH LIGHT GUIDE PLATE HAVING ANTIREFLECTION PORTIONS ON LIGHT INCIDENT SURFACES

BACKGROUND OF THE INVENTION

1. Field of the Invention

This invention relates to display devices, and more particularly to a display device which is capable of presenting a stereoscopic display or simultaneously displaying two different images in separate angular directions, and which is used for an information equipment terminal.

2. Description of the Related Art

In a prior-art display device which is capable of stereoscopic display or two-screen display (in which two different images are simultaneously displayed in separate angular directions), a pair of light sources are arranged in the vicinities of both the end faces of a light guide plate whose surface is formed with a light extraction portion having a directionality in the emergent angle of light, by a roughening work or the like, and the light extraction portion is overlaid with a dual-side prism sheet and a transmission type liquid crystal panel, wherein the pair of light sources are alternately turned ON, and two different images are displayed on the transmission type liquid crystal panel in synchronism with the alternate turn-ON operations, thereby to present the stereoscopic display or two-image display (refer to, for example, T. Sasagawa, et al.: "Dual Directional Backlight for Stereoscopic LCD", P 1-P 3, Society for Information Display '03 DIGEST (2003)).

The light guide plate of the prior-art stereoscopic display device or the prior-art display device displaying the two images in the separate angular directions, is constructed as stated above. Therefore, in light outputted from the light source at one end, light except direct light which emerges in a luminous intensity distribution for one image, from the light extraction portion in consequence of light guide, arrives at the other end and is reflected into reflection light which is guided in the opposite direction. When the reflection light emerges from the light extraction portion, it comes to have a luminous intensity distribution for the other image, and hence, the two images are observed in superposition. This has resulted in the problem that the contrast of the stereoscopic image or two different images lower.

SUMMARY OF THE INVENTION

This invention has been made in order to solve the problem as stated above, and provides a display device which can enhance the contrast of stereoscopic image or two different images with uniform luminous intensity distributions maintained.

A display device according to this invention includes a light guide plate which includes light transmission portions and antireflection portions at both its end faces, and which is provided with a light extraction portion in part of its surface, a pair of light sources which are arranged on outer sides of both the end faces, a transmission type liquid crystal panel which is arranged in adjacency to the light extraction portion, and a synchronous drive unit that alternately turns ON the pair of light sources so as to display images synchronous with the alternate turn-ON operations, on the transmission type liquid crystal panel.

Besides, a display device according to this invention includes a light guide plate which includes antireflection portions at both its end faces, which includes hole arrays inside both the end faces, and which is provided with a light extraction portion in part of its surface, a pair of light sources which are inserted in the hole arrays, a transmission type liquid crystal panel which is arranged in adjacency to the light extraction portion, and a synchronous drive unit that alternately turns ON the pair of light sources so as to display images synchronous with the alternate turn-ON operations, on the transmission type liquid crystal panel.

Besides, a display device according to this invention includes a light guide plate which includes two transparent plates, each being such that one of both end faces of the transparent plate is a light transmission portion, while the other is an antireflection portion, and that a light extraction portion is provided in part of a surface of the transparent plate, the transparent plates being placed one over the other so that the light extraction portions may be held in the same sense, and that the light transmission portions may lie oppositely to each other, a pair of light sources which are arranged on outer sides of the light transmission portions, a transmission type liquid crystal panel which is arranged in adjacency to one of the light extraction portions, and a synchronous drive unit that alternately turns ON the pair of light sources so as to display images synchronous with the alternate turn-ON operations, on the transmission type liquid crystal panel.

Further, a display device according to this invention includes a light guide plate which is provided with a light extraction portion in part of its surface, a pair of light sources which are arranged on outer sides of both end faces of the light guide plate, a light reflection member which is arranged in the vicinity of that surface of the light guide plate which is opposite to the surface provided with the light extraction portion, and in a manner to define gaps serving as antireflection portions, between the light reflection member and both the end faces, a transmission type liquid crystal panel which is arranged in adjacency to the light extraction portion, and a synchronous drive unit that alternately turns ON the pair of light sources so as to display images synchronous with the alternate turn-ON operations, on the transmission type liquid crystal panel.

According to this invention, antireflection portions are provided at parts other than light transmission portions, whereby reflection light ascribable to the retrocession of light inputted from one end after being reflected from the other end can be reduced, and the contrast of a display image can be enhanced.

DETAILED DESCRIPTION OF THE INVENTION

Embodiment 1

Hereinafter, an embodiment of the present invention will be described with reference to the drawings. The inventors have found out that, in view of the operating principles of a two-image display, the prevention of reflection from the end face of a light guide plate is an effective expedient as elucidated below.

Figure 1:
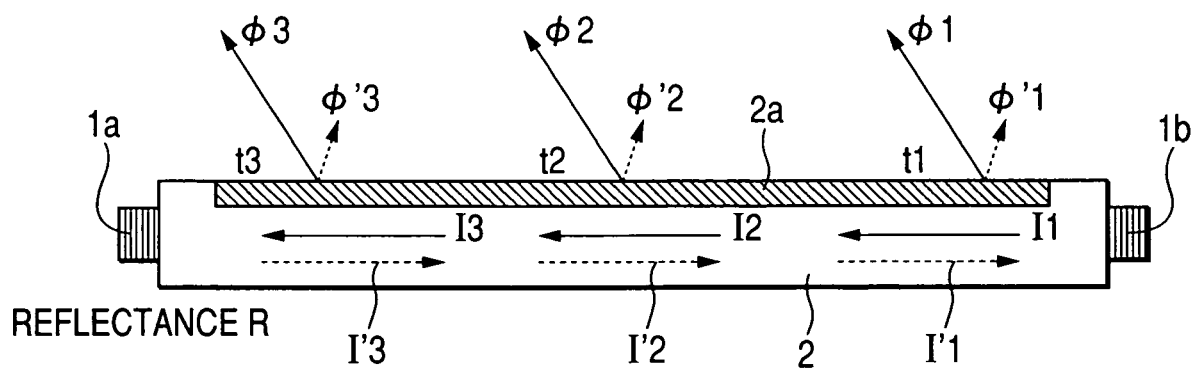
FIG. 1 is an explanatory diagram for explaining the propagation of light within a light guide plate according to this invention.

In a case where light has been inputted from one light source to the light guide plate, the luminance distribution of light emergent from a light extraction portion can be computed as stated below, from the situation of light propagating within the light guide plate, and so on. FIG. 1 is an explanatory diagram for explaining the propagation of light within the light guide plate in a configuration in which a pair of light sources are arranged on the outer sides of both the end faces of the light guide plate 2. Referring to FIG. 1, it is assumed that only the light source 1b of the pair of light sources 1a and 1b is turned ON. I1 denotes the propagation intensity of light near the light input end of the light guide plate 2 as seen from the light source 1b, I2 denotes the propagation intensity of light in the middle of the light guide plate, and I3 denotes the propagation intensity of light near the reflection end of the light guide plate. A mean reflection factor at the reflection end is denoted by R. Regarding the light extraction efficiencies of the light extraction portion 2a provided in the light guide plate 2, t1 denotes the light extraction efficiency near the light input end of the light guide plate, t2 denotes the light extraction efficiency in the middle, and t3 denotes the light extraction efficiency near the reflection end. Regarding luminances based on light beams as which the direct light propagating within the light guide plate 2 leftward from the light source 1b is extracted from the light extraction portion 2a, φ1 denotes the luminance near the light input end of the light guide plate, φ2 denotes the luminance in the middle, and φ3 denotes the luminance near the reflection end. Regarding propagation light intensities in the case where reflection light reflected at the reflection end of the light guide plate propagates rightward, I'1 denotes the light intensity near the light input end, I'2 denotes the light intensity in the middle, and I'3 denotes the light intensity near the reflection end. Further, regarding luminances based on light beams as which the reflection light is extracted from the light extraction portion 2a, φ'1 denotes the luminance near the light input end of the light guide plate, φ'2 denotes the luminance in the middle, and φ'3 denotes the luminance near the reflection end.

The ratio between the luminance based on the direct light and the luminance based on the reflection light in the lights extracted from the light extraction portion 2a is defined as the contrast of the light guide plate. C1 denotes the contrast at the light input end, C2 denotes the contrast in the middle, and C3 denotes the contrast at the light output end.

Luminance of the direct light: $\phi n = tn \times In$ where $n=1, 2, 3$

Luminance of the reflection light: $\phi'n\ tn \times I'n$

Propagation intensity of the reflection light: $I'3 = R \times I3$
Besides, the propagation intensities at both the ends of the light guide plate are computed from the symmetry of the procession and retrocession of light, as follows:

$$I'1 = I'3 \times I3/I1 = R \times I3 \times I3/I1$$

$$I'2 = I'3 \times I3/I2 = R \times I3 \times I3/I2$$

The contrast is computed as follows:

$$Cn = \phi n/\phi'n = tn \times In/(tn \times I'n) = In/I'n$$

That is, $$C = (I1/I3)^2/R \quad (1)$$

$$C2 = (I2/I3)^2/R \quad (2)$$

$$C3 = 1/R \quad (3)$$

Alternatively, in terms of the light extraction efficiencies, $$C1 = ((\phi 1/\phi 3)(t3/t1))2/R \quad (4)$$

$$C2 = ((\phi 2/\phi 3)(t3/t2))2/R \quad (5)$$

$$C3 = 1/R \quad (6)$$

It is understood from the above computational formulas that the contrast Cn and the reflection factor R at the reflection end of the light guide plate are in inversely proportional relationships at all the positions of the light guide plate, and that the reflection factor R must be reduced in order to enhance the contrast. On the other hand, to set t3>t1 and t3>t2 in the formulas (4)-(6) is a condition under which the contrast is enhanced on the whole surface of the light guide plate without resorting to the reduction of the reflection factor R. However, the light guide plate of a stereoscopic display device using the pair of light sources must have symmetric optical characteristics for the respective lights from the pair of light sources, that is, it must hold t3=t1, so that the condition of setting t3>t1 and t3>t2 cannot be adopted.

Also, to set φ3<φ1 or φ3<φ2 is a condition under which the contrast is enhanced on the whole surface of the light guide plate without resorting to the reduction of the reflection factor R. Under this condition, however, the luminance distribution becomes nonuniform, and the symmetry condition of φ3=φ1 is not met, so that the condition cannot be adopted. For the above reasons, the reflection factor R needs to be reduced for the enhancement of the contrast.

Figure 2:
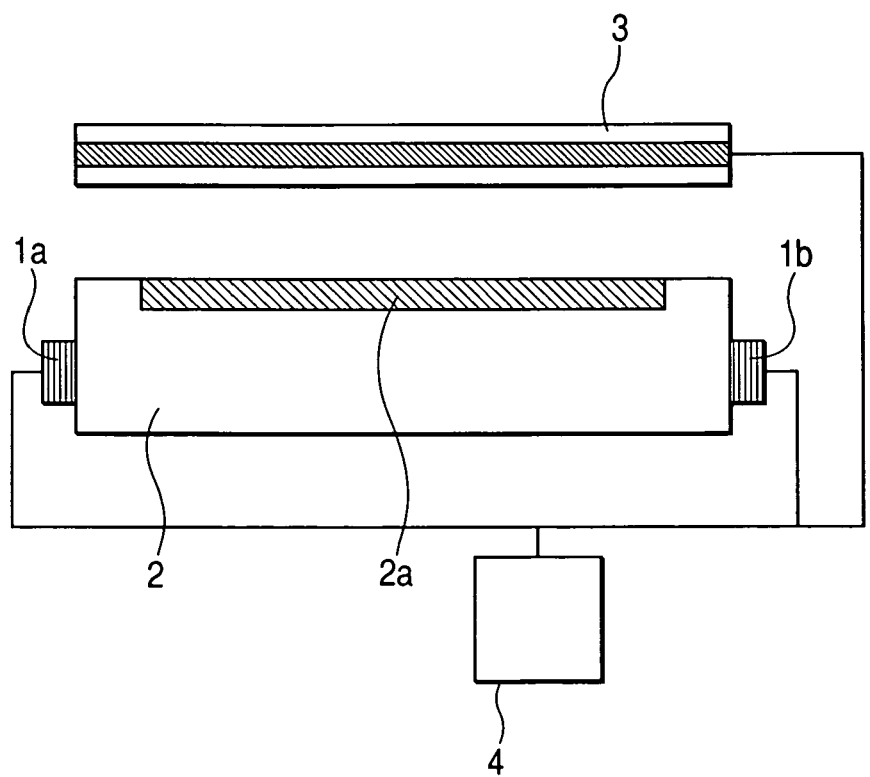
FIG. 2 is a model diagram of a display device in Embodiment 1 of the invention.
Figure 3A:
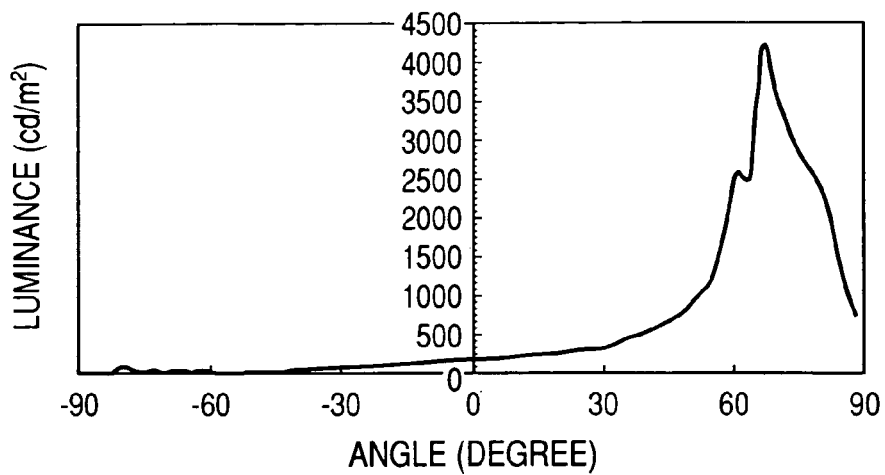
FIGS. 3A and 3B are graphs showing the distribution of luminous intensities from a light extraction portion as well as a prism sheet according to this invention.
Figure 4:
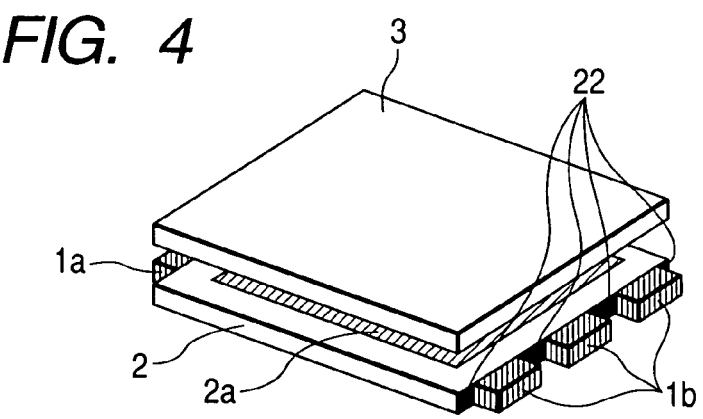
FIG. 4 is a perspective view of the display device in Embodiment 1 of the invention.
Figure 5:
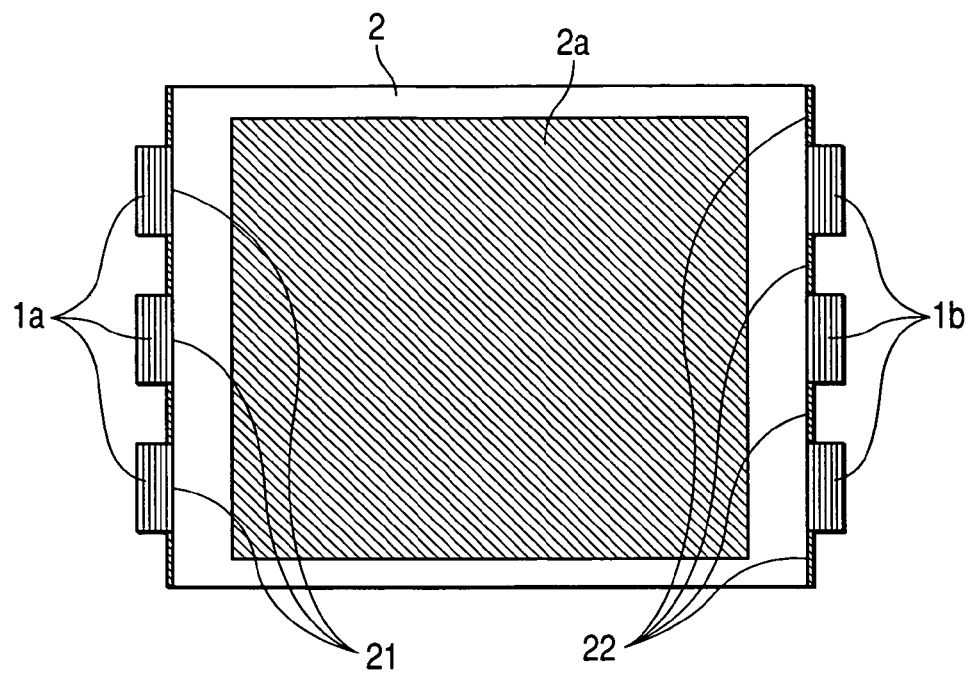
FIG. 5 is a top view of a light guide plate in Embodiment 1 of the invention.

FIG. 2 is a model diagram for explaining a display device in Embodiment 1 for carrying out this invention. Referring to FIG. 2, pairs of light sources 1a and 1b are arranged in the vicinities of both the end faces of a light guide plate 2. Lights outputted from the light sources 1a or 1b propagate within the light guide plate 2, and they are extracted onto the side of a transmission type liquid crystal panel 3 from a light extraction portion 2a disposed in the surface of the light guide plate 2. The light extraction portion 2a is constructed by subjecting the surface of the light guide plate 2 to a roughening work so that light having passed through this light extraction portion may have a directionality. FIG. 3A shows the luminous intensity distribution of the light which is emergent from the light extraction portion 2a when only the light sources 1a are turned ON. In FIG. 3A, the axis of abscissas represents that inclination angle of the light guide plate 2 in which the clockwise inclination angle thereof is taken in a + direction with the normal direction thereof set at zero degree, while the axis of ordinates represents a luminance (in $cd/m^2$). The light emergent from the light extraction portion 2a passes through the transmission type liquid crystal panel 3 while holding the luminous intensity distribution shown in FIG. 3A, thereby to become image information. On the other hand, a luminous intensity distribution in the case where the light sources 1b are turned ON becomes one which is obtained in such a way that the luminous intensity distribution in FIG. 3A is inverted in bilateral symmetry with respect to the position of zero degree. The light sources 1a and 1b are alternately turned ON by a synchronous drive unit 4, and two different images are displayed on the transmission type liquid crystal panel 3 in synchronism with the alternate turn-ON operations, whereby the two different images can be simultaneously observed from separate angles. FIG. 4 is a perspective view showing the arrangement of the light sources 1a and 1b, the light guide plate 2 and the transmission type liquid crystal panel 3 in this embodiment. FIG. 5 is a top view in which the light guide plate 2 and the light sources 1a and 1b in this embodiment are seen from the side of a display surface. Those parts of the end faces of the light guide plate 2 to which the light sources 1a and 1b are vicinal are made of light transmission portions 21, and the other parts are made of antireflection portions 22. As the antireflection portions, it is considered to form, for example, a dielectric multilayer film functioning as an antireflection film, on the outer side of the end face of the light guide plate 2. Mentioned as an example of the dielectric multilayer film is a multilayer film in which the film of tantalum dioxide being a high refractivity film, and the film of silicon dioxide being a low refractivity film are alternately deposited.

The effect of the enhancement of the contrast in this case is computed as stated below. As regards FIG. 5, denoting by α the proportion of the area of those parts of each end face of the light guide plate which are provided with the antireflection portions, denoting by (1−α) the proportion of the area of the light transmission portions, denoting by R0 the reflection factor of the whole end face in the case where the end face is not partly provided with the antireflection portions, and denoting by Re the reflection factor of the whole end face in the case where the end face is partly provided with the antireflection portions, the relationship of a formula indicated below holds:

$Re=(1-\alpha) \times R0 (0<\alpha<1)$

In this embodiment, assuming the area of the antireflection portions to be, for example, the half of the end face of the light guide plate, α=0.5 holds, and Re=0.5×R0 is obtained.

The contrasts C1, C2 and C3 in this case become as follows, when contrasts C10, C20 and C30 in the case where the end face is not provided with the antireflection portions are substituted into Formulas (1), (2) and (3):

$C1=2\times C10$ $C2=2\times C20$ $C3=2\times C30$

That is, according to the invention, the contrasts can be enhanced double higher than in the case where any antireflection portion is not provided over the whole surface of the light guide plate.

As described above, in this embodiment, those parts of each end face of the light guide plate which are not vicinal to the light sources are formed of the antireflection portions as shown in FIG. 5. Therefore, as to each of the lights for simultaneously displaying the two different images, the light which has reached the antireflection portions of the reflection end face opposed to the input end face has its reflection attenuated, and the display device capable of two-screen display of high contrast can be realized.

Incidentally, although the dielectric multilayer film which functions as the antireflection film has been exemplified as the antireflection portions in this embodiment, it is also allowed to employ another antireflection film, for example, a film which is coated with the particles of silicon dioxide being a low refractivity material. Alternatively, since the reflection is preventable by endowing the antireflection portions with a light absorbability, it is also allowed to employ a method in which sheets of high light absorbability are stuck to the antireflection portions, or a method in which the antireflection portions are coated with a coating material of high light absorbability.

Embodiment 2

Figure 6:
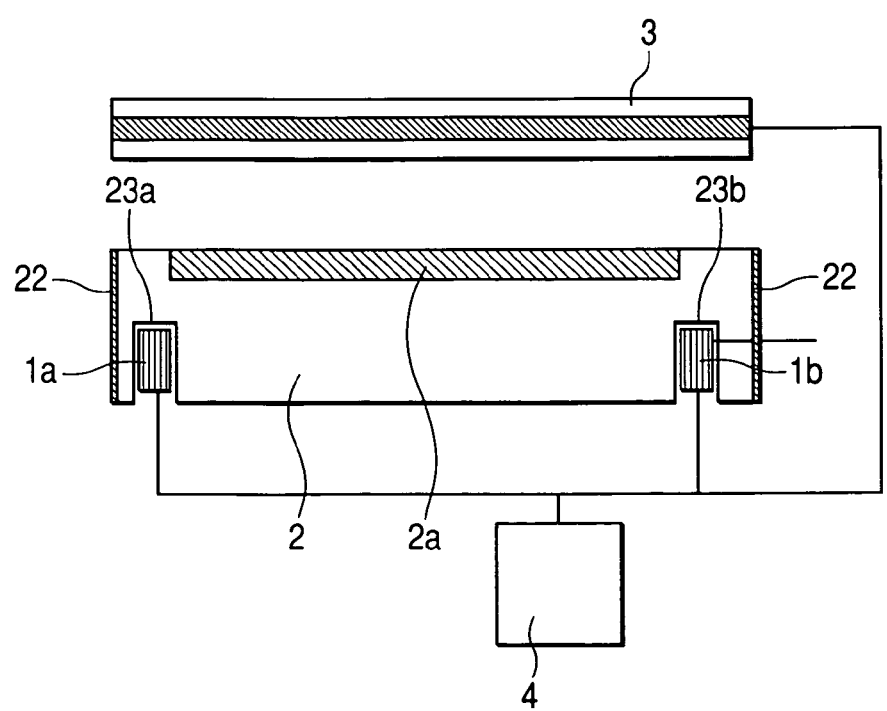
FIG. 6 is a model diagram of a display device in Embodiment 2 of the invention.

FIG. 6 is a model diagram for explaining a display device according to Embodiment 2 for carrying out this invention. Referring to FIG. 6, both the end faces of a light guide plate 2 are antireflection portions 22, and hole arrays 23a and 23b are provided inside both the end faces. Pairs of light sources 1a and 1b are such that light emitting diodes (LEDs) are embedded in the hole arrays 23a and 23b, respectively. Lights outputted from the light sources 1a or 1b propagate within the light guide plate 2, and they are extracted onto the side of a transmission type liquid crystal panel 3 from a light extraction portion 2a disposed in the surface of the light guide plate 2. The light extraction portion 2a is constructed by subjecting the surface of the light guide plate 2 to a roughening work so that light having passed through this light extraction portion may have a directionality. When only the light sources 1a are turned ON, a luminous intensity distribution shown in FIG. 3A is established, and when only the light sources 1b are turned ON, a luminous intensity distribution is established in which the luminous intensity distribution in FIG. 3A is inverted in bilateral symmetry with respect to the position of zero degree. The light emergent from the light extraction portion 2a passes through the transmission type liquid crystal panel 3 while holding the luminous intensity distribution as stated above, thereby to become image information. The light sources 1a and 1b are alternately turned ON by a synchronous drive unit 4, and two different images are displayed on the transmission type liquid crystal panel 3 in synchronism with the alternate turn-ON operations, whereby two observers who simultaneously observe from separate angles can recognize the different images, respectively.

Figure 7:
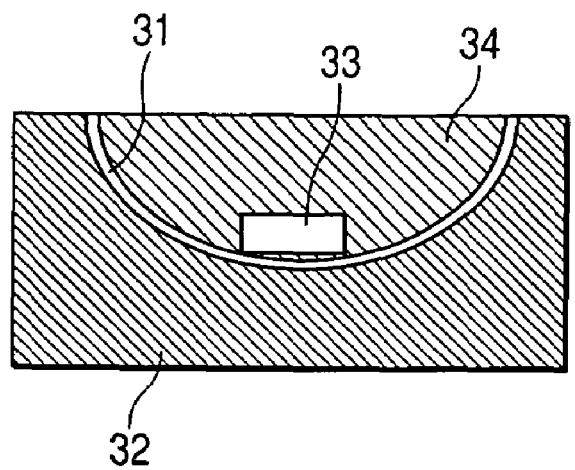
FIG. 7 is a model diagram of a light emitting diode in Embodiment 2 of the invention.

FIG. 7 is a model diagram of an LED which constitutes the light source 1a or 1b in this embodiment. An LED chip 33 which emits light of single wavelength is arranged within an LED case 32 whose inner surface is formed with a reflection film 31. The surroundings of the LED chip 33 are filled up with a light emitting member 34 by which the light of single wavelength emitted from the LED chip 33 is converted into white light. The light emitting member 34 is, for example, one in which a phosphor is dispersed and mixed in a resin. The LED case 32 is made of a material whose light absorbability is high. The reflection film 31 serves to prevent the light emitted from the LED chip 33, from being absorbed by the LED case 32, and simultaneously to endow the light with a directionality for the purpose of outputting the light much onto the inner side of the light guide plate 2.

Figure 8:
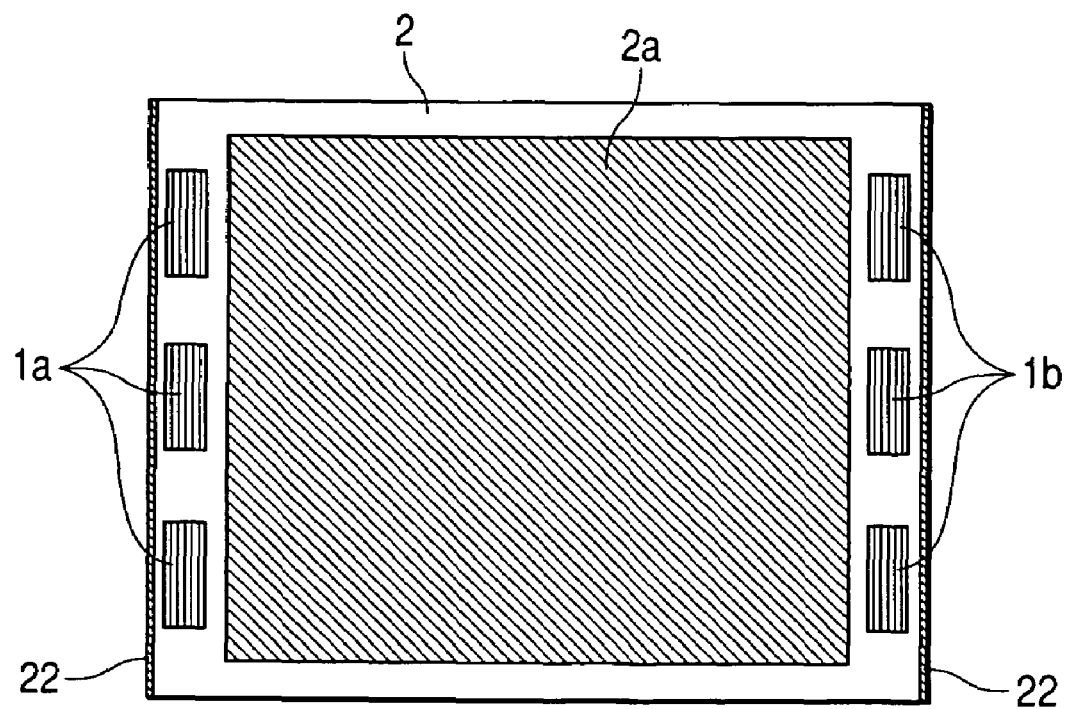
FIG. 8 is a top view of a light guide plate in Embodiment 2 of the invention.

FIG. 8 is a top view in which the light guide plate 2 and the light sources 1a and 1b in this embodiment are seen from the side of a display surface. Both the end faces of the light guide plate 2 are the antireflection portions 22. Each of the antireflection portions 22 is such that a black sheet of high light absorbability, for example, is stuck on the end face of the light guide plate 2. As to each of the lights emitted from the light sources 1a or 1b, the light having reached the opposite end face of the light guide plate has its reflection light attenuated by the antireflection portion. Further, also the light having reached the LED case of each light source 1a or 1b can have its reflection light attenuated by being absorbed by this LED case which is made of the material of high light absorbability. As a result, the unnecessary reflection lights are reduced, and contrast can be enhanced.

Incidentally, although the sheet of high light absorbability has been employed as each antireflection portion in this embodiment, a coating material of high light absorbability may well be applied. Alternatively, each antireflection portion may well be a dielectric multilayer film which functions as an antireflection film, or a film which is coated with the particles of silicon dioxide being a low refractivity material. Besides, although the LED case has been made of the material of high light absorbability, it may well be replaced with a construction in which the outer surface of an LED case of low light absorbability is coated with a light-absorbable coating material. Besides, although the embodiment has indicated the example in which each LED emitting the light of single wavelength is combined with the light emitting member in order to convert the emitted light into the white light, an LED which emits the white light may well be employed. In this case, the light emitting member is dispensed with.

Embodiment 3

Figure 9:
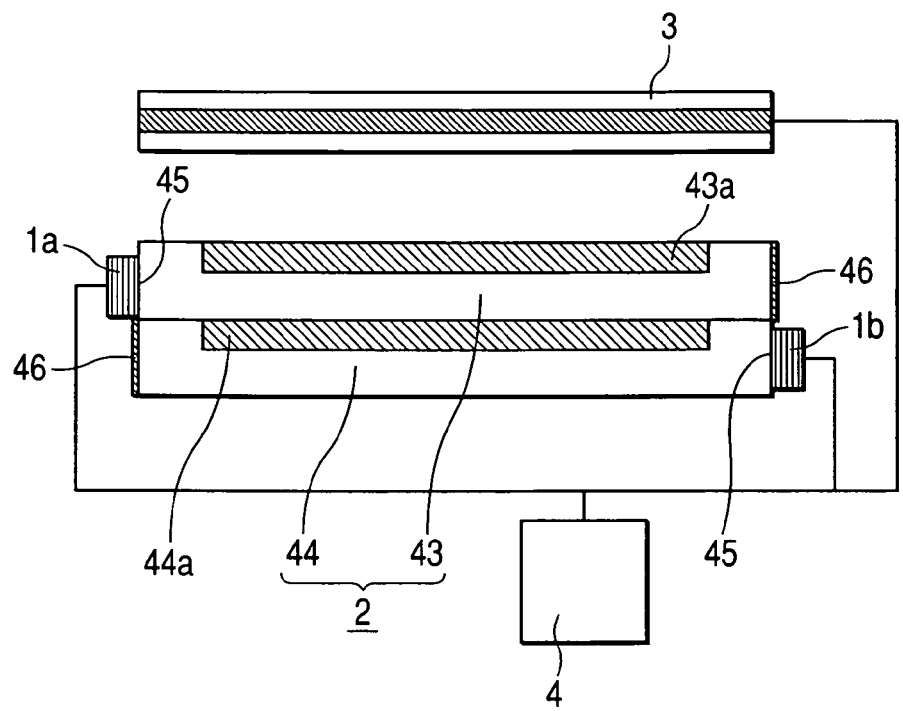
FIG. 9 is a model diagram of a display device in Embodiment 3 of the invention.

FIG. 9 is a model diagram for explaining a display device in Embodiment 3 for carrying out this invention. As shown in FIG. 9, a light guide plate 2 in this embodiment is constructed of two transparent plates 43 and 44, each of which is such that one of the end faces of the light guide plate is a light transmission portion 45, while the other is an antireflection portion 46. The two transparent plates 43 and 44 are placed one over the other in such a manner that light extraction portions 43a and 44a are held in the same sense, and that the light transmission portions 45 are opposite to each other. Pairs of light sources 1a and 1b are arranged on the outer sides of the light transmission portions 45. The light extraction portion 43a is constructed by subjecting the surface of the transparent plate 43 to a roughening work so that lights emitted from the light sources 1a and guided through this transparent plate 43 may become a luminous intensity distribution as shown in FIG. 3A. Likewise, the light extraction portion 44a is constructed by subjecting the surface of the transparent plate 44 to a roughening work so that lights emitted from the light sources 1b and guided through this transparent plate 44 may become a luminous intensity distribution in which the luminous intensity distribution in FIG. 3A has been inverted in bilateral symmetry with respect to the position of zero degree. The light outputted from the light source 1a or 1b and emergent from the light extraction portion 43a or 44a passes through a transmission type liquid crystal panel 3 while holding the luminous intensity distribution as stated above, thereby to become image information. A Synchronous drive unit 4 turns ON the light sources 1a and 1b alternately, and two different images are displayed on the transmission type liquid crystal panel 3 in synchronism with the alternate turn-ON operations. Thus, two observers can recognize the different images by observing them from separate angles, respectively.

In this embodiment, the antireflection portions 46 of the transparent plates 43 and 44 can be formed on the whole end faces, so that α used in the case of calculating the effect of the contrast enhancement in Embodiment 1 described before (that is, the proportion of the area of the parts where the antireflection portions are provided) can be set at 1 (one) Therefore, Re=0 holds, and the contrast becomes infinity in theory and is enhanced 10 times or more in actuality. Moreover, since the light guide plate 2 is separated into the transparent plates 43 and 44 for the respective light sources in this embodiment, the distributions of the extraction rates of the light extraction unit in Formulas (4), (5) and (6) can be designed as t3>t2>t1 independently for the respective light sources, and hence, the contrast is enhanced still more.

Incidentally, as each antireflection portion 46, it is possible to employ a dielectric multilayer film which functions as an antireflection film, a film which is coated with the particles of silicon dioxide being a low refractivity material, a sheet which has a light absorbability, or a coating film which includes a coating material of high light absorbability.

Embodiment 4

Figure 10:
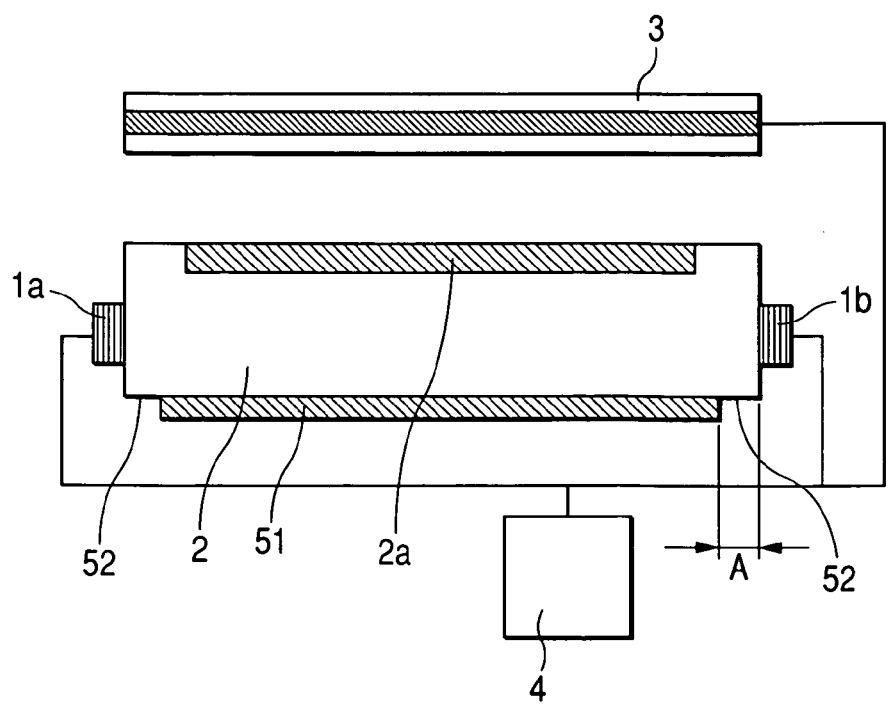
FIG. 10 is a model diagram of a display device in Embodiment 4 of the invention.

FIG. 10 is a model diagram of a display device in Embodiment 4. Referring to FIG. 10, a light reflection member 51 is disposed in the vicinity of that surface of a light guide plate 2 which is opposite to the surface thereof provided with a light extraction portion 2a. The light reflection member 51 is smaller in width than the light guide plate 2, and gaps 52 are provided between this light reflection member 51 and both the end faces of the light guide plate 2. Since each of the gaps 52 has a light reflection factor lower than that of the light reflection member 51, it functions as an antireflection portion.

Figure 11:
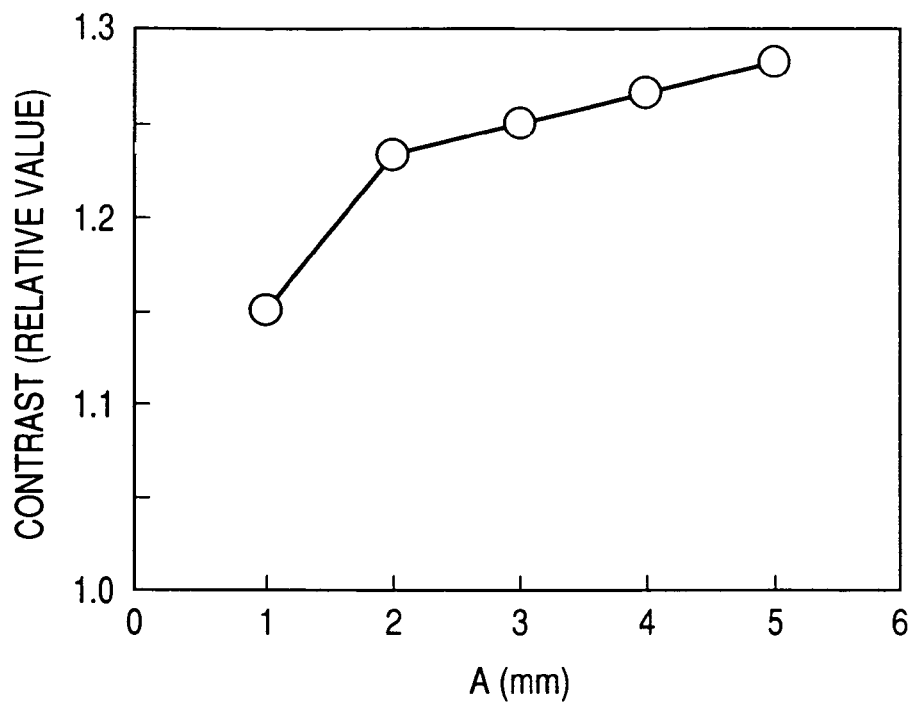
FIG. 11 is a characteristic diagram in Embodiment 4 of the invention.

Owing to such a construction, when part of light outputted from a light source 1a arranged at one end part has arrived at the other end part, it is reflected from the other end part to propagate onto the side of the light sources 1a, but part of the reflected light is emergent out of the light guide plate 2 through the gap 52. That is, since the gap 52 is lower in the light reflection than the light reflection member 51, it functions as the antireflection portion. FIG. 11 shows a result which has been obtained by simulating the relationship between the width A of the gap 52 from the end part and the contrast, when the thickness of the light guide plate 2 was 1 mm. As seen from FIG. 11, the contrast is enhanced more as the width A becomes larger. When the width A enlarges to make the light reflection member 51 narrower than the region of the light extraction portion 2a, a light beam quantity for displaying an image as emerges out of the light extraction portion 2a decreases, and hence, the width A cannot be made very large.

Incidentally, although the surface of each gap 52 is not especially subjected to any treatment in this embodiment, the contrast is enhanced still more by forming an antireflection film or a light absorption film on the surface of the gap 52.

Embodiment 5

Figure 12:
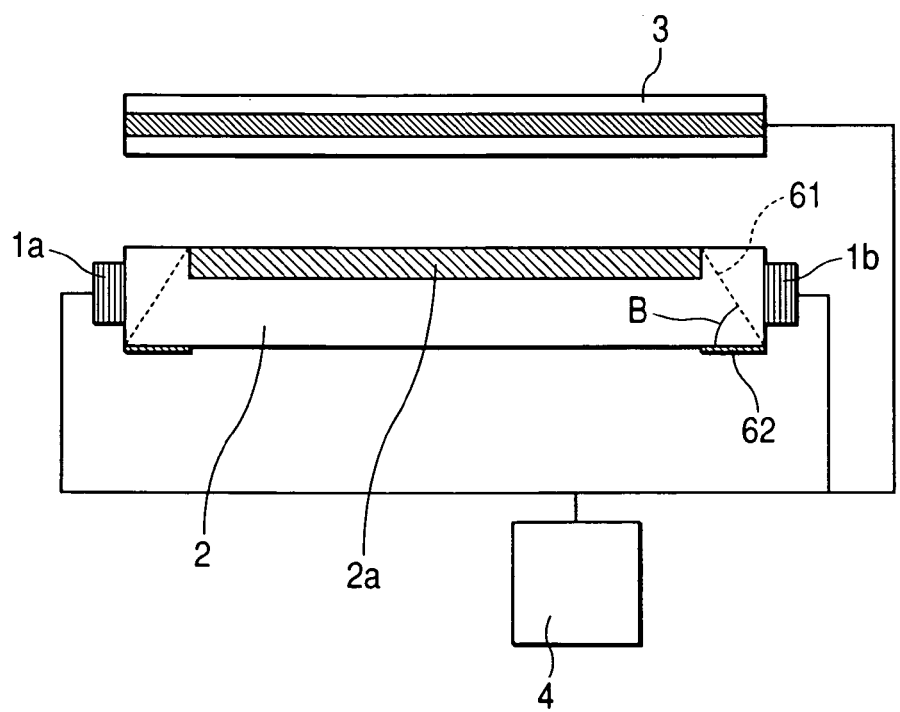
FIG. 12 is a model diagram of a display device in Embodiment 5 of the invention.
Figure 13:
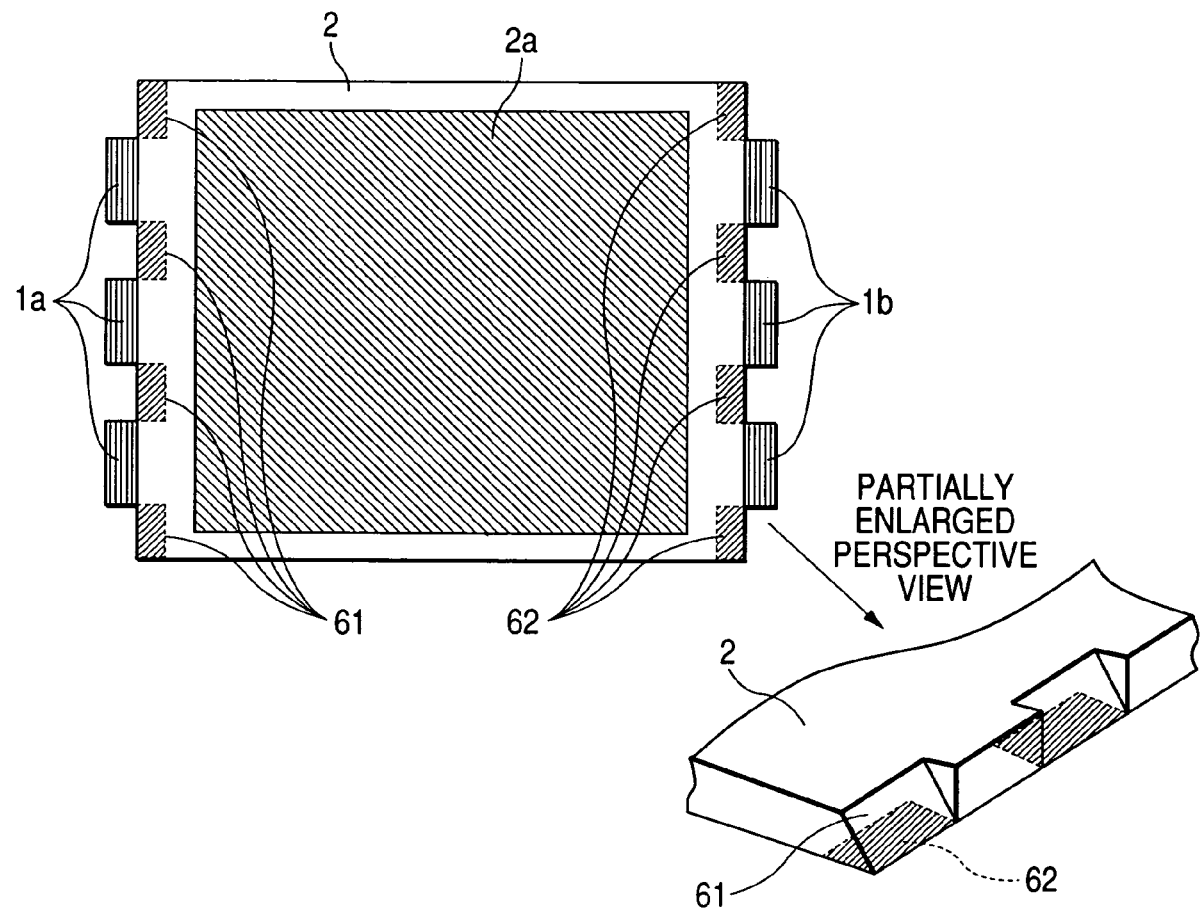
FIG. 13 is a top view of a light guide plate in Embodiment of the invention.

FIG. 12 is a model diagram of a display device in Embodiment 5. Referring to FIG. 12, those regions of the end faces of a light guide plate 2 on which light sources 1a and 1b are not disposed are formed in the shape of wedges, and antireflection films 62 are provided on those surfaces of the light guide plate 2 which oppose to the oblique surfaces of wedge-shaped portions 61. FIG. 13 is a top view in which the light guide plate 2 and the light sources 1a and 1b in this embodiment are seen from the side of a display surface. As shown in an enlarged perspective view, those parts of both the end faces of the light guide plate 2 on which the light sources are not disposed are formed in the shape of the wedges, and the antireflection films 62 are provided at positions opposed to the oblique surfaces of the wedge-shaped portions 61.

In this embodiment, in lights outputted from the light sources 1a or 1b, lights having arrived at the opposite end face of the light guide plate 2 are mostly radiated out through the wedge-shaped portions 61, but parts of the lights are reflected downwardly of the light guide plate 2 at the parts of the oblique surfaces of the wedge-shaped portions 61, and the reflection lights are attenuated by the antireflection films 62. As a result, the unnecessary reflection lights can be reduced, and the contrast of two-screen display can be enhanced. Denoting by B an angle which is defined between the wedge-shaped portion 61 and the surface opposed to the oblique surface of this wedge-shaped portion, the angle B should preferably be about 45°. When the angle B is greater than 45°, a probability at which the unnecessary reflection lights return to the light guide plate 2 heightens. Conversely, when the angle B is smaller than 45°, the oblique surfaces of the wedge-shaped portions 61 lengthen, and the area of the light extraction portion 2a of the light guide plate 2 needs to be decreased in some cases.

Incidentally, each antireflection film 62 may well be another antireflection film, for example, a film which is coated with the particles of silicon dioxide being a low refractivity material. Besides, since the antireflection film 62 may suffice to have the effect of reducing the reflection of the light, it may well be changed into a light absorption film. Mentioned as the light absorption film is, for example, a sheet of high light absorbability or a coating film of high light absorbability.

Besides, although the construction in which the light sources 1a and 1b are arranged so as to confront each other has been shown in FIG. 13, the light sources 1a or 1b may well be constructed so as to confront the wedge-shaped portions 61 of the opposite end parts of the light guide plate 2, respectively.

Embodiment 6

Figure 14:
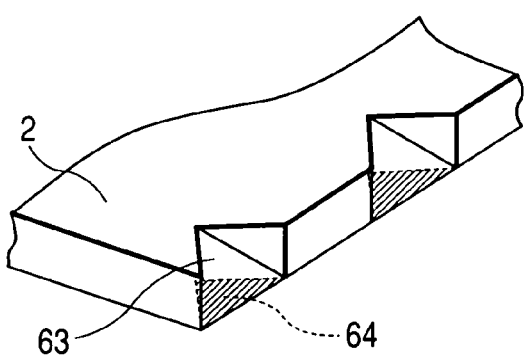
FIG. 14 is a partial enlarged perspective view of a light guide plate in Embodiment 6 of the invention.

In Embodiment 5, the part of the oblique surface of each wedge-shaped portion is formed to be oblong, and hence, it sometimes intercepts light which is outputted from the light source arranged in the vicinity of the wedge-shaped portion, and which spreads in a lateral direction. Therefore, the lights between the light sources are not sufficiently mixed, and a stripe-shaped luminance nonuniformity might appear from the position at which the wedge-shaped portion is arranged. FIG. 14 is the partial enlarged perspective view of a light guide plate for use in a display device in Embodiment 6. In this embodiment, the light guide plate 2 having antireflection portions as shown in FIG. 14 is employed in the same construction as in Embodiment 5. Referring to FIG. 14, the oblique surface of each wedge-shaped portion 63 is formed so as to decrease its area toward the middle of the light guide plate 2, and an antireflection film 64 is provided at a position opposed to the oblique surface.

Owing to such a construction, in lights outputted from the light sources, lights having arrived at the opposite end face of the light guide plate 2 are mostly radiated out through the wedge-shaped portions 63, but parts of the lights are reflected downwardly of the light guide plate 2 at the parts of the oblique surfaces of the wedge-shaped portions 63, and the reflection lights are attenuated by the antireflection films 64. As a result, the unnecessary reflection lights can be reduced, and the contrast of two-screen display can be enhanced. Furthermore, the lights which spread laterally from the light sources arranged in the vicinities of the wedge-shaped portions 63 are not intercepted by these wedge-shaped portions 63, and the uniformity of luminances is enhanced.

Embodiment 7

Figure 15:
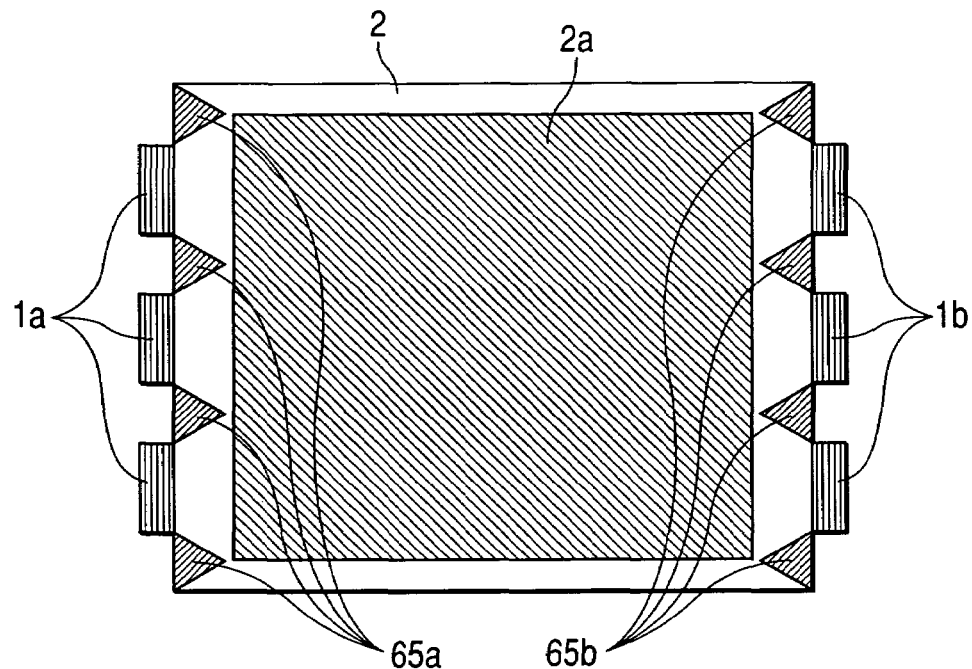
FIG. 15 is a top view of a light guide plate in Embodiment 7 of the invention.

FIG. 15 is a top view of a light guide plate 2 for use in a display device in Embodiment 7. In this embodiment, triangular light absorption portions 65a and 65b are provided at those positions of the surface of the light guide plate 2 at which lights from light sources 1a or 1b located at the end parts of the light guide plate 2 do not directly arrive, a light extraction portion 2a being provided in the surface.

Owing to such a construction, the lights outputted from the light sources 1a arranged at one end part are absorbed by the light absorption portions 65b provided at the other end part, and the lights outputted from the light sources 1b are not absorbed by these light absorption portions 65b. Therefore, luminances are not lowered, and contrast is enhanced.

By the way, in this embodiment, the light absorption portions 65a and 65b have been formed on the surface in which the light extraction portion 2a is provided, but they may well be formed on the surface of the light guide plate 2 opposite to the surface formed with the light extraction portion 2a, or they may well be formed on both the surfaces of the light guide plate 2. Besides, the contrast is enhanced still more by combining this embodiment with the construction of Embodiment 1.

Embodiment 8

Figure 16:
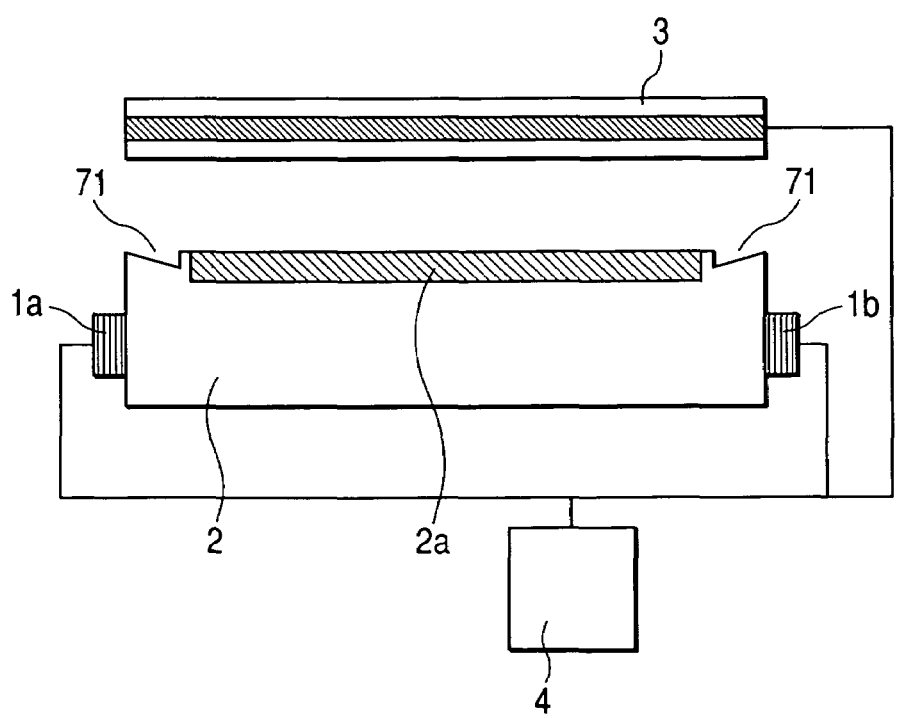
FIG. 16 is a model diagram of a display device in Embodiment 8 of the invention.
Figure 17:
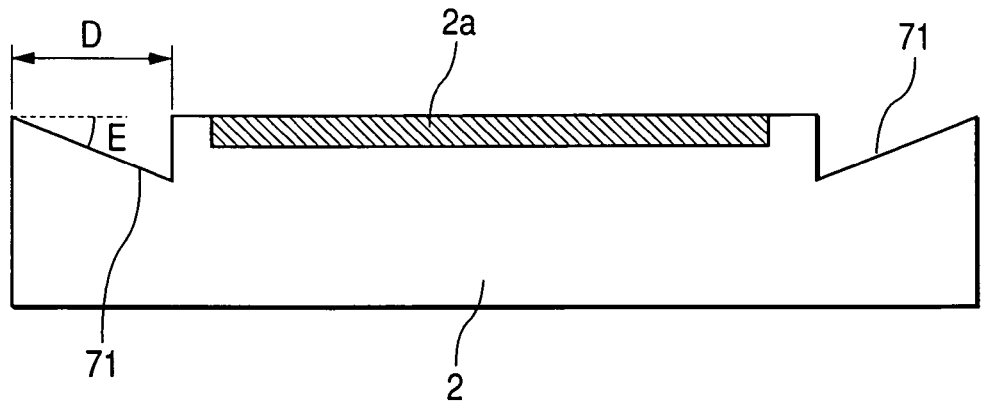
FIG. 17 is a model diagram of a light guide plate in Embodiment 8 of the invention.

FIG. 16 is a model diagram of a display device in Embodiment 8. Referring to FIG. 16, recesses 71 of wedge-shaped section are formed between a light extraction portion 2a provided in the surface of a light guide plate 2 and the end parts of this light guide plate. FIG. 17 is a sectional view of the light guide plate 2 in this embodiment. Each of the recesses 71 having the wedge-shaped section has a length D from the end part of the light guide plate 2, and an angle E is defined between the oblique surface of the wedge-shaped recess 71 and the surface of the light guide plate 2.

Owing to such a construction, when part of light outputted from a light source 1a arranged at one end part of the light guide plate 2 has arrived at the recess 71 provided at the other end part, it is radiated out of the light guide plate 2 through the recess 71. Therefore, in the light outputted from the light source on one side, the light having arrived at the opposite end face of the light guide plate 2 has its reflection reduced, and contrast can be enhanced.

Figure 18:
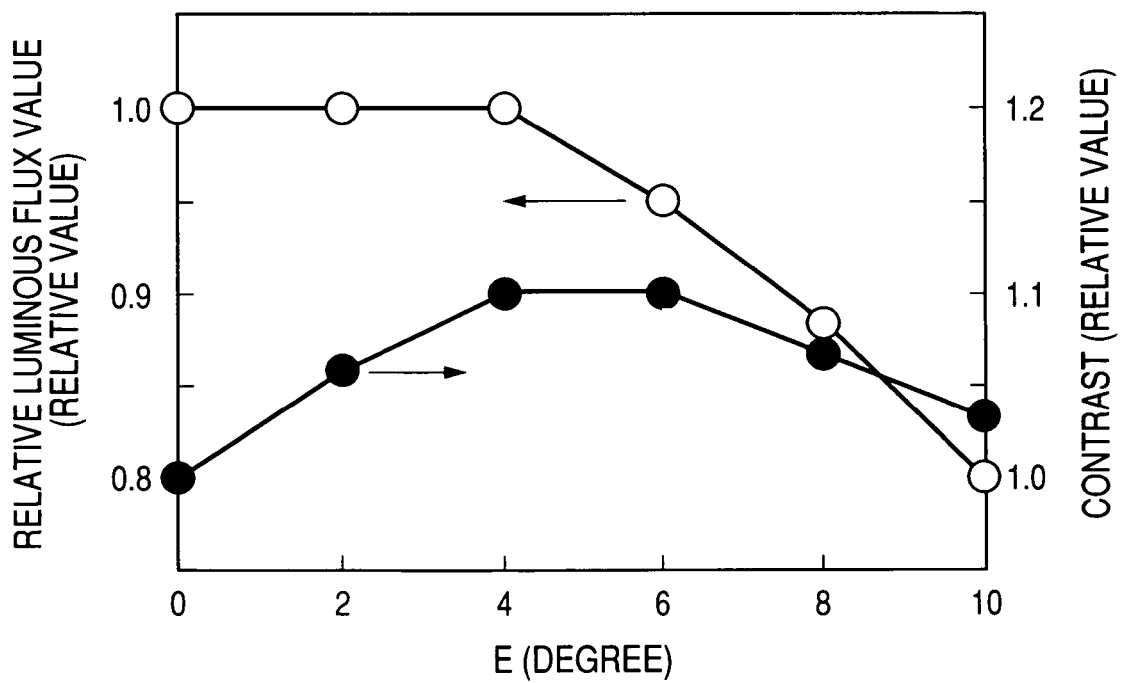
FIG. 18 is a characteristic diagram in Embodiment 8 of the invention.

FIG. 18 shows results which have been obtained by simulating a relative light beam quantity extracted from the light extraction portion 2a and the E-dependency of the contrast in the case of changing the angle E defined between the oblique surface of each wedge-shaped portion 71 and the surface of the light guide plate 2, when the thickness of the light guide plate 2 was 1 mm, and the length D of each recess 71 was 3 mm. As seen from FIG. 18, the effect of the contrast enhancement is great in the region of 2-6 degrees in terms of the angle E, but the light beam quantity decreases at and above 5 degrees in terms of the angle E. Therefore, the angle E should desirably be 4 degrees or below.

Figure 19:
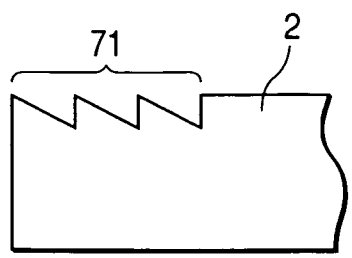
FIG. 19 is a partial sectional view of the light guide plate in Embodiment 8 of the invention.

By the way, in this embodiment, the recesses 71 have been formed on only that surface side of the light guide plate 2 which is provided with the light extraction portion 2a, but they may well be provided in the surface of the light guide plate 2 opposite to the surface provided with the light extraction portion 2a, or they may well be provided in both the surfaces of the light guide plate 2. Besides, in this embodiment, each recess 71 of wedge-shaped section has been formed in a shape having one oblique surface, but it may well be constructed by forming a plurality of small recesses of wedge-shaped section as shown in FIG. 19.

Further, when a light absorption film is deposited on the oblique surface and vertical surface of each recess 71, it is possible to prevent a phenomenon in which light radiated out of the light guide plate 2 is reflected by any other member to enter the light guide plate 2 again. Therefore, the contrast is enhanced still more.

Embodiment 9

Figure 3B:
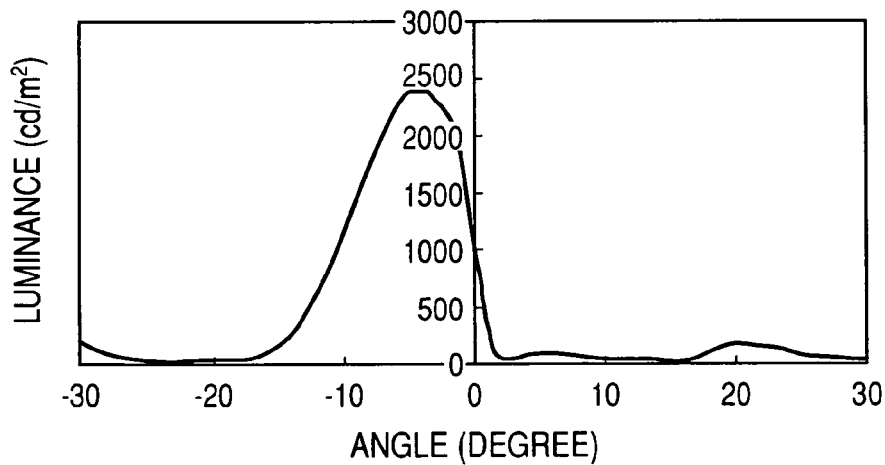
Figure 20A:
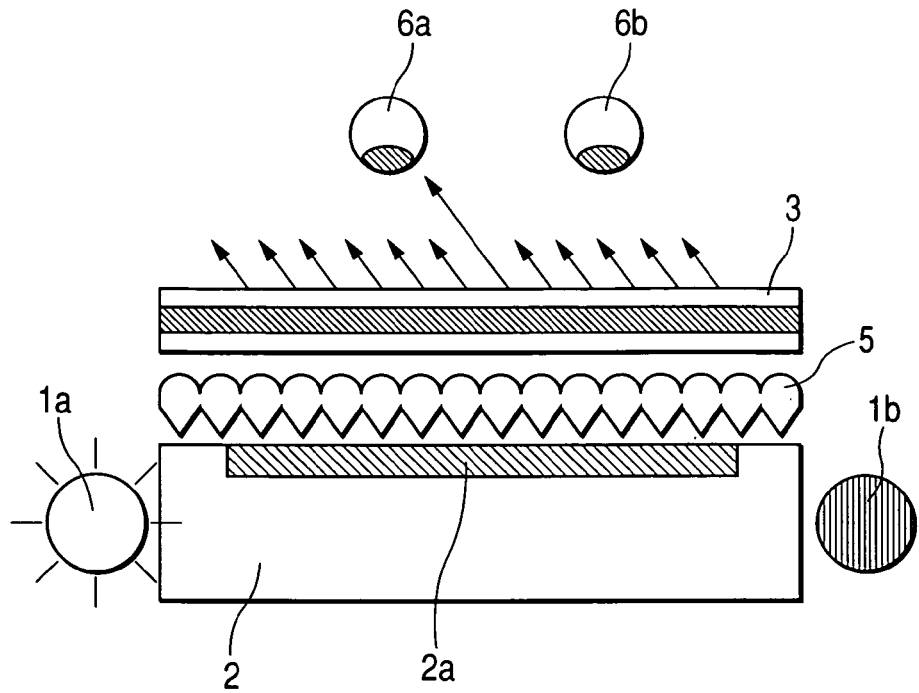
FIGS. 20A and 20B are explanatory diagrams in Embodiment 9 of the invention.
Figure 20B:
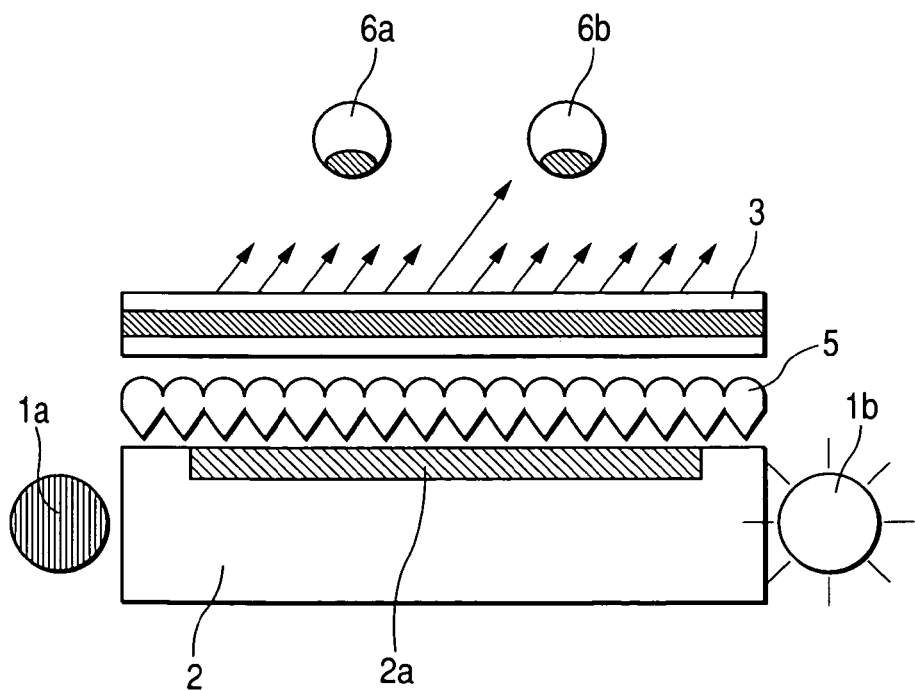

The operating principles of Embodiment 9 will be described with reference to FIGS. 20A and 20B. A display device in the embodiment of the invention is such that a prism sheet 5 is arranged between a light extraction portion 2a and a transmission type liquid crystal panel 3. As shown in FIGS. 20A and 20B, trains of prisms of triangular section are formed in the surface of the prism sheet 5 opposed to the light extraction portion 2a, and trains of lenses of cylindrical section are formed in the surface thereof opposed to the transmission type liquid crystal panel 3. The construction of the display device except the arrangement of the prism sheet 5 is the same as that of the display device described in Embodiment 1. Each of lights which emerge from the light extraction unit 2a when only the light sources 1a are turned ON and which have the luminous intensity distribution as shown in FIG. 3A, is refracted and reflected within the prism sheet 5 while passing through this prism sheet 5, and it comes to have a luminous intensity distribution as shown in, FIG. 3B. According to this luminous intensity distribution, the light exhibits high intensities within the left range of 0 degree to about −15 degrees with respect to the front direction of the light guide plate 2, and it hardly emerges within the right range of 0 degree to about 15 degrees. In FIG. 3B, the axis of abscissas represents that inclination angle of the surface of the prism sheet 5 opposed to the transmission type liquid crystal panel 3 in which the clockwise inclination angle thereof is taken in a +direction with the normal direction thereof set at zero degree, while the axis of ordinates represents a luminance (in cd/m$^2$). The light having the luminous intensity distribution passes through the transmission type liquid crystal panel 3 while holding this luminous intensity distribution. Assuming that an observer exists at a distance of about 300 mm from the front of the panel 3, and that the interval between the right eye 6a and left eye 6b of the observer is 65 mm, an angle which is defined between a straight line connecting the center of the transmission type liquid crystal panel 3 and the right eye 6a and the normal direction of the transmission type liquid crystal panel 3 becomes about 6 degrees. On this occasion, regarding an image having the luminous intensity distribution as shown in FIG. 3B, as shown in FIG. 20A, the image can be recognized by the right eye 6a of the observer, but it is not recognized by the left eye 6b because the light does not arrive. On the other hand, when only the light sources 1b are turned ON, it is possible to display an image in a luminous intensity distribution into which the luminous intensity distribution shown in FIG. 3B is bilaterally inverted with respect to zero degree. In this case, as shown in FIG. 20B, only the left eye 6b can recognize the image, and the image is not recognized by the right eye 6a. Therefore, in a case where the light sources 1a and 1b are alternately turned ON by the synchronous drive unit (not illustrated) and where the right and left parallactic images are displayed on the transmission type liquid crystal panel 3 in synchronism with the alternate turn-ON operations, the observer can recognize the different parallactic images by the right and left eyes, respectively, and a stereoscopic vision based on parallax becomes possible.

In the display device thus constructed, in lights outputted from the respective light sources for displaying the right and left parallactic images, lights having arrived at the opposite end faces of the light guide plate have their reflection lights attenuated by the antireflection portions. Therefore, the contrasts of the images can be enhanced, and the clear stereoscopic image is obtained.

By the way, in this embodiment, the construction except the arrangement of the prism sheet has been made the same as that of Embodiment 1, but the same construction as in Embodiment 1 may well be replaced with the same construction as in any of Embodiments 2 through 4.

What is claimed is:

1. A display device comprising:
    a light guide plate which includes first and second opposed end faces, and a light extraction surface transverse to the first and second end faces;
    first and second light sources respectively located along the first and second end faces, wherein the first and second end faces include respective light transmissive portions vicinal the first and second light sources, and antireflection portions not vicinal the first and second light sources;
    a transmission liquid crystal panel located adjacent to the light extraction surface; and
    a synchronous drive unit that alternately turns on and off the first and second light sources so that an image is displayed on the liquid crystal display panel and is synchronous with alternating turn turning on and turning off of the transmission liquid crystal panel.

2. The display device according to claim 1, including hole arrays of holes located inside the light guide plate proximate the first and second opposed end faces, wherein the first and second light sources are located in respective holes of the hole arrays.

3. The display device according to claim 1, wherein the antireflection portion includes antireflection films on parts of the first and second end faces.

4. The display device according to claim 1, wherein the antireflection portion includes light absorption films on parts of the first and second end faces.

5. The display device according to claim 4, wherein the light absorption films include light-absorbing sheets or light-absorbing coatings.

6. The display device according to claim 1, wherein the antireflection portion includes a wedge-shaped portion in cross-section, and includes an antireflection film on a surface opposed to an oblique surface of the wedge-shaped portion.

7. The display device according to claim 1, wherein the antireflection portion includes wedge-shaped portion in cross-section, and includes a light absorption film on a surface opposed to an oblique surface of the wedge-shaped portion.

8. The display device according to claim 1, including a prism sheet located between the light extraction surface and the transmission liquid crystal display panel.

9. The display device according to claim 8, wherein the prism sheet includes:
- an array of prisms of triangular section on a first surface of the prism sheet, and
- an array of cylindrical lenses aligned in the same direction as the array of prisms and on a second surface of the prism sheet, and the prism sheet is arranged so that a longitudinal direction of the array of prisms is in the same direction as the first and second end faces of the light guide plate at which the antireflection portion is located, and so that the prism array is opposed to the light extraction surface.

10. The display device according to claim 1, wherein each of the first and second light sources includes a plurality of light emitting diodes.

11. The display device according to claim 1, wherein the antireflection portion includes in contact with opposite ends of at least one of (i) the surface of the light guide plate including the light extraction surface and (ii) a surface of the light guide plate opposed to the surface including the light extraction surface, and
- the antireflection portion includes a recess having a wedge-shaped cross-section which inclines toward a center of the light guide plate.

12. The display device according to claim 11, wherein an angle defined between an inclined surface of the recess and the light extraction surface of the light guide plate does not exceed 4 degrees.

13. The display device according to claim 11, wherein an inclined surface of the recess includes a light absorption film.

14. The display device according to claim 1, wherein the light guide plate includes first and second recesses respectively located opposite the first and second end faces of the light guide plate and the first and second light sources are located within the first and second recesses, respectively.

15. The display device according to claim 1, wherein the light guide plate includes a front surface that includes the light extraction surface, the front surface including first and second oblique portions that are oblique to the light extraction surface and to the first and second end faces in a cross-section transverse to the light extraction surface and to the first and second end faces, the first and second oblique portions being respectively disposed between the light extraction surface and the first and second end faces and inclining toward a center of the light guide plate as part of the antireflection portion.

16. The display device according to claim 1, wherein the light transmission portion is located at a different position on each of the first and second opposed end faces than the antireflection portions with respect to a direction parallel to the light extraction surface.

17. The display device according to claim 16, wherein the antireflection portion includes light absorption films on parts the first and second end faces.

18. The display device according to claim 1, wherein
- the light guide plate includes a rear surface opposite the light extraction surface,
- each of the first and second opposed end faces includes first portions that are transverse to the light extraction surface and second portions that are oblique to the light extraction surface and to the rear surface in a cross-section taken perpendicular to the light extraction surface and the rear surface,
- the first portions of the first and second opposed end faces are located at different positions of each of the first and second opposed end faces from the second portions with respect to a direction parallel to the light extraction surface,
- each of the first portions includes a light transmission portion, and
- the antireflection portion includes antireflection films disposed on parts of the rear surface of the light guide plate, opposite the second portions of the first and second opposed end faces.

19. The display device according to claim 18, wherein each of the first and second light sources includes a plurality of light emitting diodes.

20. The display device according to claim 18, wherein the antireflection films are disposed on the rear surface of the light guide plate only opposite the second portions of the first and second end faces.

* * * * *